US012752637B2

(12) United States Patent
Isami et al.

(10) Patent No.: US 12,752,637 B2
(45) Date of Patent: Oct. 6, 2026

(54) BATTERY ELECTRIC VEHICLE

(71) Applicant: TOYOTA JIDOSHA KABUSHIKI KAISHA, Toyota (JP)

(72) Inventors: Yoichiro Isami, Mishima (JP); Kenji Mizutani, Toyota (JP); Hirotaka Ikegami, Toyota (JP); Akihito Yasue, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 307 days.

(21) Appl. No.: 18/429,989

(22) Filed: Feb. 1, 2024

(65) Prior Publication Data

US 2024/0317073 A1 Sep. 26, 2024

(30) Foreign Application Priority Data

Mar. 20, 2023 (JP) ................................ 2023-044466

(51) Int. Cl.
*B60L 15/20* (2006.01)
*B60L 50/60* (2019.01)

(52) U.S. Cl.
CPC ........... *B60L 15/2054* (2013.01); *B60L 50/60* (2019.02); *B60L 2240/30* (2013.01);
(Continued)

(58) Field of Classification Search
CPC .. B60L 15/2054; B60L 50/60; B60L 2240/30; B60L 2240/48; B60L 2250/16;
(Continued)

(56) References Cited

U.S. PATENT DOCUMENTS

2008/0278442 A1* 11/2008 Kishi ................ G01C 21/3664 345/156
2016/0004424 A1 1/2016 Suzuki et al.
(Continued)

FOREIGN PATENT DOCUMENTS

JP 2002250636 A * 9/2002
JP 2006-313002 A 11/2006
(Continued)

OTHER PUBLICATIONS

English translation of Yu et al. (JP 2022036843) (Year: 2022).*
English translation of Sakai et al. (JP 2002250636) (Year: 2002).*

*Primary Examiner* — Kyle J Kingsland
(74) *Attorney, Agent, or Firm* — SoraIP, Inc.

(57) ABSTRACT

A battery electric vehicle includes: a mode selection device in which one travel mode is selected from a plurality of travel modes by an operation of a driver, the travel modes including a motor travel mode in which a motor is controlled such that required torque required for traveling is output to a drive shaft, and a shift travel mode in which the motor is controlled such that torque output to the drive shaft based on a shift operation by the driver is simulation torque that simulates torque behavior in an engine vehicle equipped with an engine and a stepped transmission; and a control device that controls the motor such that the battery electric vehicle travels in the travel mode selected by the mode selection device. The control device prohibits a change in the simulation torque while the battery electric vehicle is traveling, when the shift travel mode is selected.

4 Claims, 4 Drawing Sheets

(52) U.S. Cl.
CPC ....... *B60L 2240/48* (2013.01); *B60L 2250/16* (2013.01); *B60L 2260/26* (2013.01)

(58) Field of Classification Search
CPC ........... B60L 2260/26; B60L 2240/423; B60L 2240/443; B60L 2240/486; B60L 15/20; Y02T 10/72
See application file for complete search history.

(56) References Cited

U.S. PATENT DOCUMENTS

| | | | | |
|---|---|---|---|---|
| 2019/0118815 | A1* | 4/2019 | Jordan, III | B60W 10/20 |
| 2022/0041064 | A1 | 2/2022 | Nishimine et al. | |
| 2022/0041066 | A1 | 2/2022 | Isami et al. | |
| 2022/0117098 | A1* | 4/2022 | Kalyanasundaram | G05B 15/02 |
| 2024/0317073 | A1 | 9/2024 | Isami et al. | |

FOREIGN PATENT DOCUMENTS

| | | | |
|---|---|---|---|
| JP | 2014-170390 | A | 9/2014 |
| JP | 2022-036824 | A | 3/2022 |
| JP | 2022-036845 | A | 3/2022 |
| JP | 2022036843 | A * | 3/2022 |
| JP | 7225671 | B2 | 2/2023 |
| JP | 7529078 | B1 | 8/2024 |

* cited by examiner

BATTERY ELECTRIC VEHICLE

CROSS-REFERENCE TO RELATED APPLICATION

This application claims priority to Japanese Patent Application No. 2023-044466 filed on Mar. 20, 2023, incorporated herein by reference in its entirety.

BACKGROUND

1. Technical Field

The present disclosure relates to a battery electric vehicle.

2. Description of Related Art

Conventionally, as a battery electric vehicle of this type, there has been proposed a battery electric vehicle including a motor that outputs power to a drive shaft connected to an axle, and a mode selection device in which one travel mode is selected from a plurality of travel modes including a motor travel mode and a shift travel mode, by an operation of a driver (for example, see Japanese Unexamined Patent Application Publication No. 2022-036845 (JP 2022-036845 A)). The motor travel mode is a travel mode in which the motor is controlled such that required torque required for traveling is output to the drive shaft. The shift travel mode is a travel mode in which the motor is controlled such that torque output to the drive shaft based on a shift operation of the driver is a simulation torque that simulates torque behavior in an engine vehicle equipped with an engine and a stepped transmission.

SUMMARY

In the battery electric vehicle described above, the battery electric vehicle is able to travel simulating torque behavior in another engine vehicle, by changing the simulation torque, when the shift travel mode is selected. However, when the simulation torque is changed, the torque output to the drive shaft may fluctuate and behavior of the vehicle may change suddenly.

A main object of the battery electric vehicle of the present disclosure is to suppress sudden changes in behavior of the vehicle.

The battery electric vehicle according to the present disclosure employs the following means to achieve the above-described main object.

The gist of a battery electric vehicle according to the present disclosure is a battery electric vehicle including:

- a motor that outputs torque to a drive shaft connected to an axle;
- a mode selection device in which one travel mode is selected from a plurality of travel modes by an operation of a driver, the travel modes including a motor travel mode in which the motor is controlled such that required torque required for traveling is output to the drive shaft, and a shift travel mode in which the motor is controlled such that torque output to the drive shaft based on a shift operation by the driver is simulation torque that simulates torque behavior in an engine vehicle equipped with an engine and a stepped transmission; and
- a control device that controls the motor such that the battery electric vehicle travels in the travel mode selected by the mode selection device.

The control device prohibits a change in the simulation torque while the battery electric vehicle is traveling, when the shift travel mode is selected.

In the battery electric vehicle according to the present disclosure, when the shift travel mode is selected, the change in the simulation torque is prohibited while the battery electric vehicle is traveling. When the simulation torque is changed, the torque output to the drive shaft may fluctuate. When such a torque fluctuation occurs while the vehicle is traveling, the behavior of the vehicle may change suddenly. However, by prohibiting changes in the simulation torque while the vehicle is traveling, it is possible to suppress sudden changes in the behavior of the vehicle.

In such a battery electric vehicle according to the present disclosure, the control device may permit the change in the simulation torque in a case in which a shift position is in a parking range, when the shift travel mode is selected.

The control device may permit the change in the simulation torque in a case in which a parking brake is operated, when the shift travel mode is selected.

This allows the simulation torque to be changed while the vehicle is reliably stopped, so the simulation torque can be changed without suddenly changing the behavior of the vehicle.

Moreover, the battery electric vehicle according to the present disclosure further includes a display device that displays information.

When the shift travel mode is selected, the control device may display, on the display device, a change reception screen for receiving an instruction to change the simulation torque, and may prohibit reception on the change reception screen while the battery electric vehicle is traveling.

As a result, since changes are not received while the vehicle is traveling, sudden changes in the behavior of the vehicle can be suppressed.

Furthermore, the battery electric vehicle according to the present disclosure further includes a display device that displays information.

When the shift travel mode is selected, the control device may display, on the display device, a change reception screen for receiving an instruction to change behavior of the simulation torque, while the battery electric vehicle is stopped, and may not display the change reception screen on the display device while the battery electric vehicle is traveling.

In this way, since changes are not received while the vehicle is traveling, sudden changes in the behavior of the vehicle can be suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, modes for carrying out the disclosure will be described using an embodiment.

Figure 1:
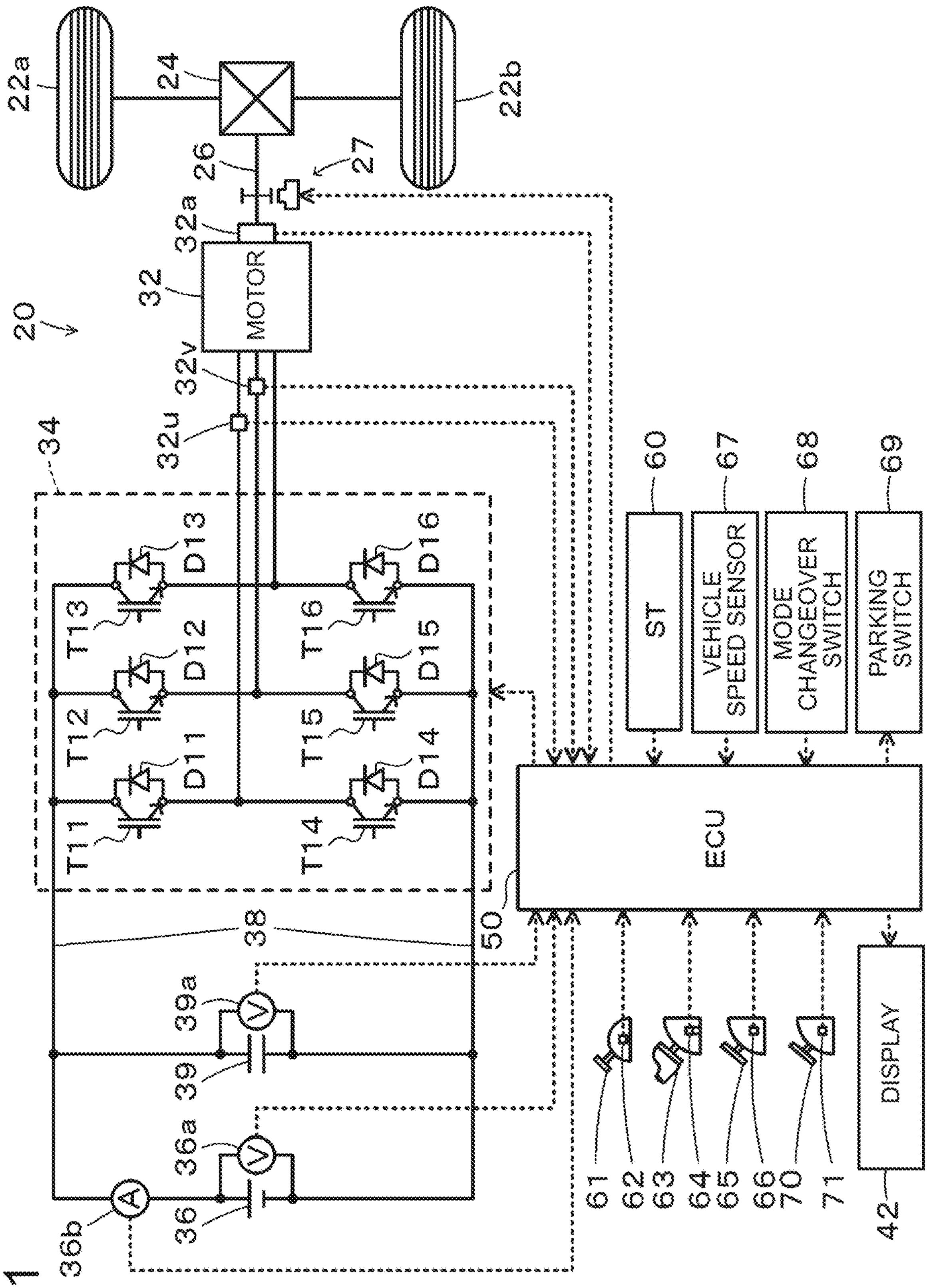
FIG. 1 is a block diagram schematically showing the structure of a battery electric vehicle 20 as an embodiment of the present disclosure.

FIG. 1 is a block diagram schematically showing the structure of a battery electric vehicle 20 as an embodiment of the present disclosure. As illustrated, the battery electric vehicle 20 of the embodiment includes a driving motor 32, an inverter 34, a battery 36, a display 42, and an electronic control unit (hereinafter referred to as "ECU") 50.

The motor 32 is configured as a three-phase AC motor, and includes a rotor in which a permanent magnet is embedded in a rotor core, and a stator in which a three-phase coil is wound around a stator core. The rotor of the motor 32 is connected to a drive shaft 26 that is connected to the drive wheels 22*a*, 22*b* via a differential gear 24. A parking brake 27 is attached to the drive shaft 26.

The inverter 34 is used to drive the motor 32. Inverter 34 is connected to battery 36 via power line 38. The inverter 34 includes six transistors T11 to T16 as switching elements, and six diodes D11 to D16 connected in parallel to each of the six transistors T11 to T16. The transistors T11 to T16 are arranged in pairs so as to be on the source side and the sink side with respect to the positive side line and the negative side line of the power line 38, respectively. The connection points of the two transistors of each pair are connected to the coils of the corresponding phases (U phase, V phase, W phase) of the motor 32, respectively. Therefore, when a voltage is applied to the inverter 34, the ECU 50 adjusts the on-time ratio of the pair of transistors T11 to T16, so that a rotating magnetic field is formed in the three-phase coil, and the motor 32 is activated. Rotationally driven.

The battery 36 is configured as a lithium-ion secondary battery or a nickel hydride secondary battery, and is connected to the inverter 34 via a power line 38. A smoothing capacitor 39 is attached to the power line 38.

The display 42 is installed near the driver's seat. The display 42 is configured as a touch panel type display device that visually displays various information. Display 42 is controlled by ECU 50.

ECU 50 includes a microcomputer having a CPU, ROM, RAM, flash memory, and input/output ports. The ECU 50 receives the rotational position Om of the rotor of the motor 32 from the rotational position sensor 32*a*, the U-phase and V-phase currents Iu and Iv of the motor 32 from the current sensors 32*u* and 32*v*, and the voltage of the battery 36 from the voltage sensor 36*a*. The voltage Vb, the current Ib of the battery 36 from the current sensor 36*b*, and the voltage VL of the power line 38 (capacitor 39) from the voltage sensor 39*a* are input. The ECU 50 receives a start signal from a start switch 60, a shift position SP which is the operating position of the shift lever 61 from a shift position sensor 62, an accelerator operation amount Acc which is the amount of depression of the accelerator pedal 63 from an accelerator pedal sensor 64, and a brake. The brake pedal position BP, which is the amount of depression of the brake pedal 65 from the pedal sensor 66, is also input. The ECU 50 also receives the vehicle speed V from the vehicle speed sensor 67, the switch signal from the mode changeover switch 68, and the depression amount Da of the clutch pedal (pseudo clutch pedal) 70 from the clutch pedal sensor 71. The shift lever 61 has a configuration that simulates a shift device included in a vehicle equipped with a manual transmission. The shift lever 61 can select a plurality of shift ranges corresponding to the gears of the simulated manual transmission as the shift position SP. For example, the shift 20 lever 61 can select one range to be simulated from a 1st speed range to a 6th speed range, and a neutral range. Each time the mode changeover switch 68 is turned on, it outputs a mode changeover instruction to switch between the motor drive mode and the variable speed drive mode. The motor drive mode and variable speed drive mode will be described later. The parking switch 69 is a switch for setting the shift position SP to the parking range. Each time 25 the parking switch 69 is turned on, it sets the shift position SP to the parking range or cancels the parking range. The clutch pedal 70 has a configuration that simulates a clutch pedal mounted on a simulated engine vehicle. The clutch pedal 70 has a configuration similar to that of a clutch pedal of a vehicle equipped with a manual transmission in terms of arrangement and feel of operation. The ECU 50 outputs control signals to the motor 32, display signals to the display 42, and the like.

In the battery electric vehicle 20 of the embodiment, the ECU 50 controls the motor 32 (inverter 34) to run in the motor drive mode or variable speed drive mode. In the motor running mode, the motor 32 outputs the required running torque Td* for running. In the variable speed driving mode, the vehicle travels with the behavior of the torque output from the motor 32 based on the driver's operation of the shift lever 61 as the behavior of the torque in an engine vehicle equipped with an engine and a manual transmission as a stepped transmission.

In the motor driving mode, the driving required torque Td* required for driving (required from the drive shaft 26) is set as the torque command Tm* of the motor 32, regardless of the shift position SP or the depression amount Da of the clutch pedal 70, and transistors T11 to T16 of the inverter 34 is controlled so that the motor 32 is driven by the torque command Tm*. Here, the required running torque Td* is set based on the accelerator operation amount Acc and the vehicle speed V. By controlling the motor 32 so that the required traveling torque Td* required for traveling is output to the drive shaft 26, the motor 32 outputs the required traveling torque Td* and the vehicle travels.

In the variable speed driving mode, the rotation speed of the clutch pedal 70 is determined based on the rotation speed Np of the drive shaft 26 (the rotation speed Nm of the motor 32), the gear ratio (speed ratio) r corresponding to the shift position SP, and the depression amount Da of the clutch pedal 70. A virtual engine speed Ne is set as the engine rotation speed in the simulated engine vehicle using the slip ratio slip, and an output is output from the engine of the simulated engine vehicle based on the accelerator operation amount Acc and the virtual engine speed Ne. Set virtual engine output torque Teout. The transmission input torque Tmtin is calculated by multiplying the torque transmission gain k, which is the transmission rate of torque from the engine to the manual transmission, by the virtual engine output torque Teout based on the slip ratio slip of the clutch pedal 70. The torque transmission gain k is set smaller when the depression amount Da of the clutch pedal 70 is large than when it is small, and the torque transmission gain k between the engine and the manual transmission is set to a value when the depression amount Da of the clutch pedal 70 is a value. The value is set to 0 when the maximum amount of depression is 0. Then, the transmission output torque (simulated torque) Tmtout is calculated by multiplying the transmission input torque Tmtin by the gear ratio (speed ratio) r corresponding to the shift position SP, and the transmission output torque Tmtout is converted into the torque command Tm* of the motor 32, and transistors T11 to T16 of the inverter 34 are controlled so that the motor 32 is driven by the torque command Tm*. In this way, the torque output to the drive shaft 26 based on the driver's operation of the shift lever 61 is a transmission output torque (simulated torque) that simulates the torque behavior in an engine vehicle equipped with an engine and a stepped transmission. By controlling the motor 32 so that Tmtou is achieved, the behavior of the torque output from the motor 32 based on the driver's operation of the shift lever 61 is made to be the behavior of torque in an engine vehicle equipped with an engine and a manual transmission. becomes possible. That is, it is possible to drive in a manner that simulates an engine vehicle equipped with an engine and a manual transmission, and it is possible to create a feeling of operation as if driving an engine vehicle equipped with an engine and a manual transmission. Further, in the variable speed driving mode, the ECU 50 controls a speaker (not shown) so that a sound (engine sound) linked to the virtual engine speed Ne is output from the pre-recorded engine sound for each engine speed. The sounds from these speakers create a feeling of operation as if you were driving an engine car equipped with an engine and a manual transmission.

Figure 2:
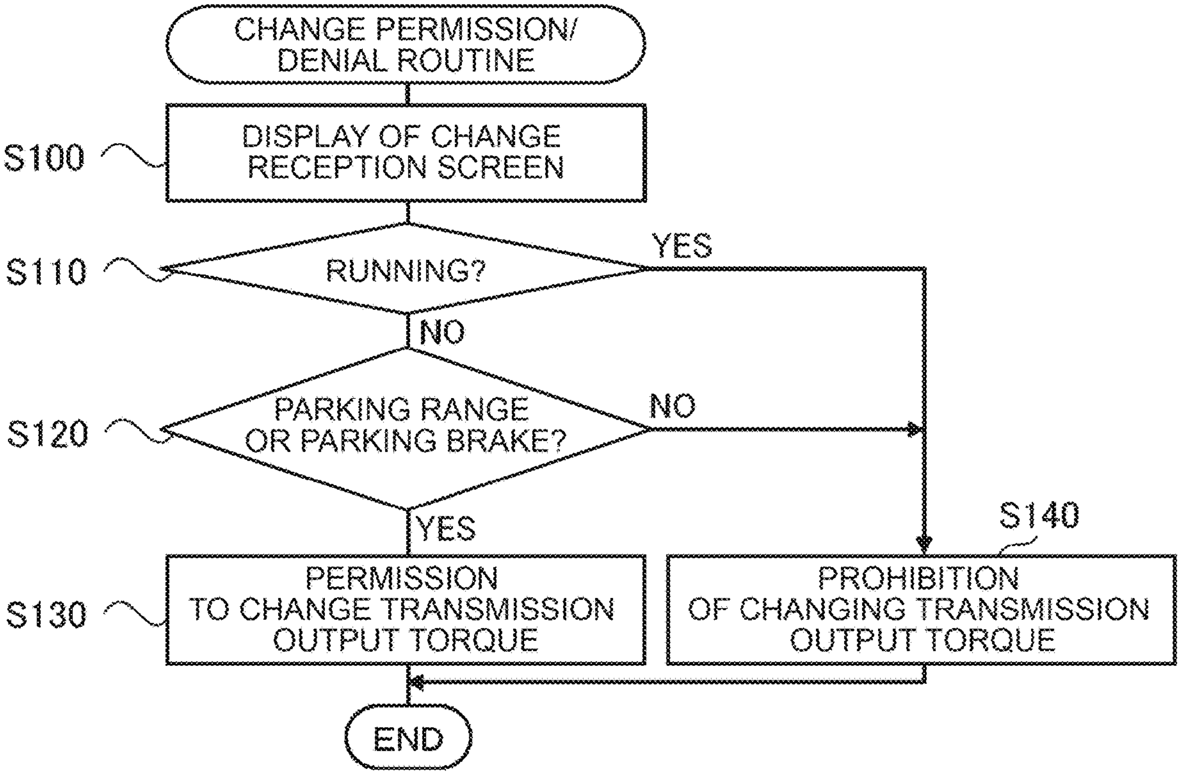
FIG. 2 is a flowchart showing an example of a change permission/denial routine executed by the ECU 50.

Next, the operation of the battery electric vehicle 20 of the embodiment configured as described above, particularly the operation when changing the transmission output torque (simulated torque) Tmtout in the variable speed driving mode, will be described. FIG. 2 is a flowchart showing an example of a change permission/denial routine executed by the ECU 50. This routine is executed at predetermined time intervals (for example, every few milliseconds) when the variable speed driving mode is selected by the mode change-over switch 68.

Figure 3:
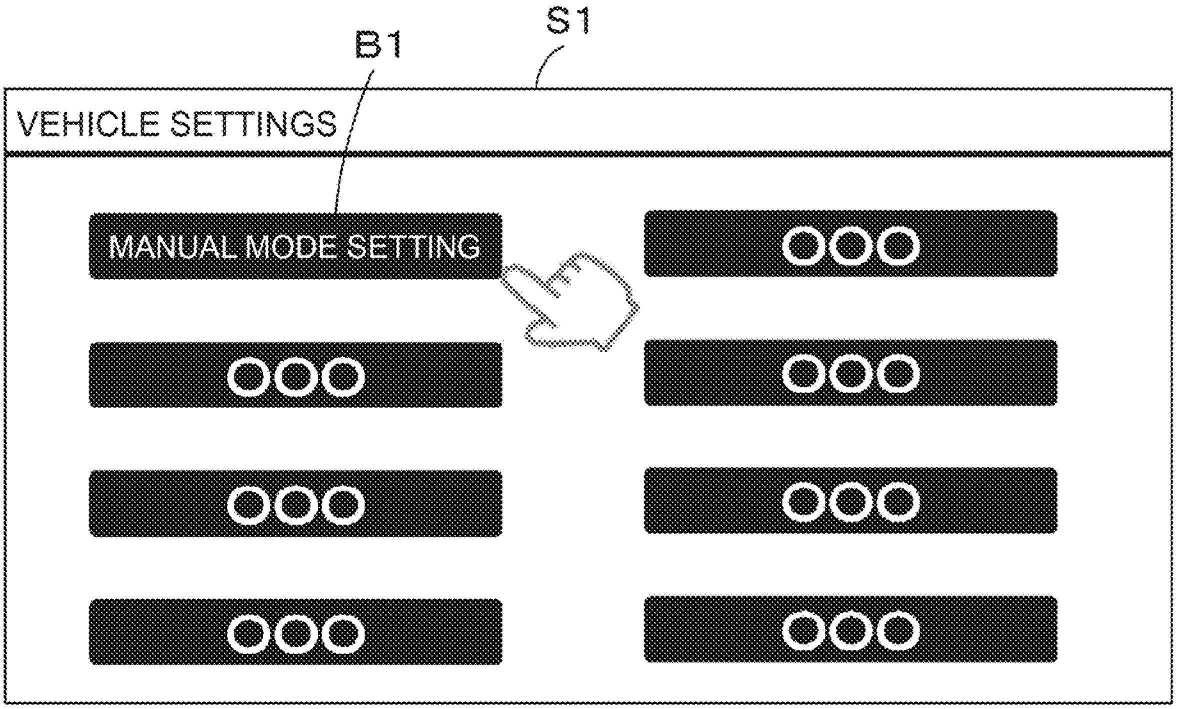
FIG. 3 is an explanatory diagram showing an example of the change reception screen S1 displayed on the display 42.

When this routine is executed, the CPU of the ECU 50 executes a process of displaying a change reception screen S1 on the display 42 (S100). FIG. 3 is an explanatory diagram showing an example of the change reception screen S1 displayed on the display 42. The change reception screen S1 is a screen for accepting an instruction from an occupant to change the transmission output torque (simulated torque) Tmtout. The change reception screen S1 is displayed on the display 42 when the variable speed driving mode is selected. On the change reception screen S1, as shown in FIG. 3, a plurality of buttons, such as a manual mode setting button B1, that can be selected by the passenger are displayed.

Subsequently, the CPU of the ECU 50 determines whether the vehicle is running (S110). When the vehicle is not running, it is determined whether the parking switch 69 has set the shift position SP to the parking range and whether the parking brake 27 is operating (S120). When the shift position SP is in the parking range or when the parking brake 27 is activated, the CPU of the ECU 50 allows a change in the transmission output torque (simulated torque) Tmtout (S130) and executes this routine. finish.

Figure 4:
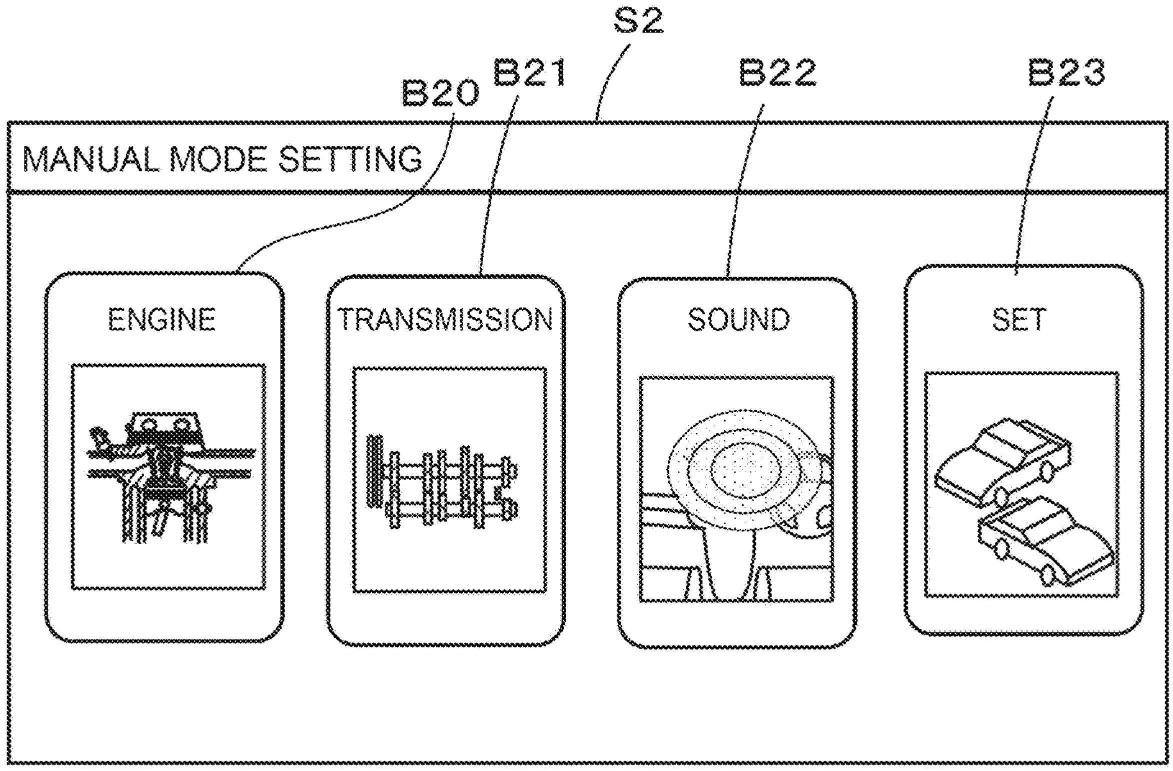
FIG. 4 is an explanatory diagram showing an example of the manual mode setting screen S2 displayed on the display 42.
Figure 5:
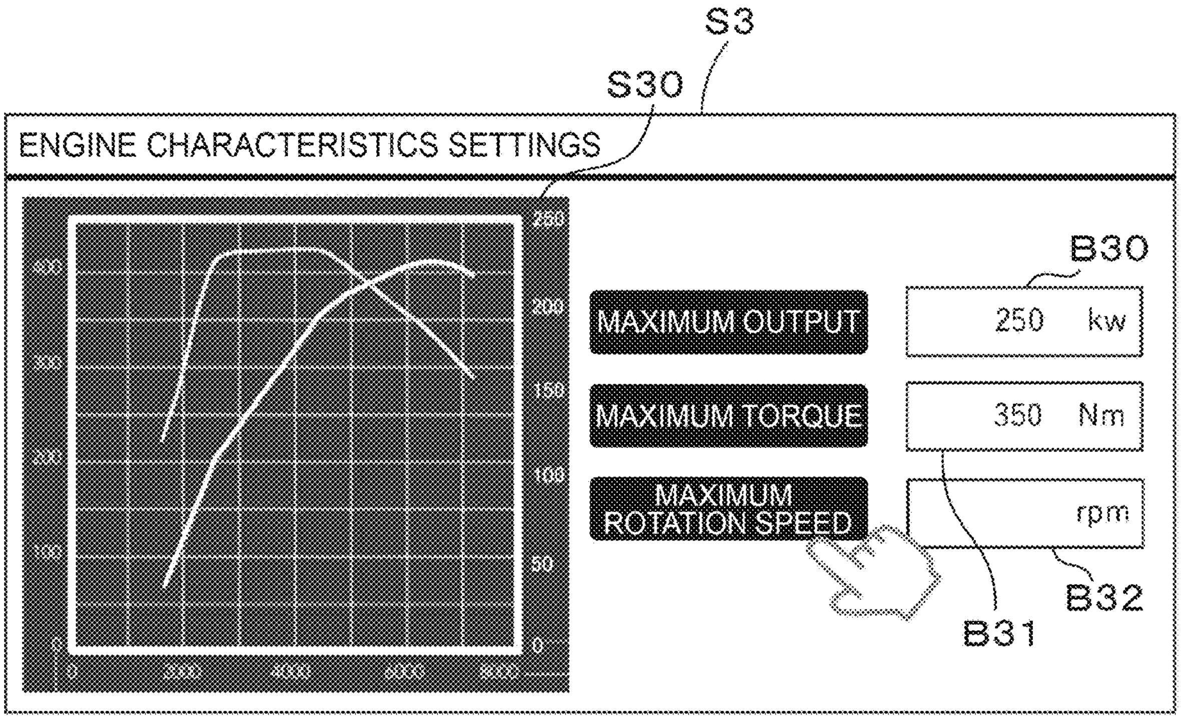
FIG. 5 is an explanatory diagram showing an example of the engine characteristics setting screen S3 displayed on the display 42.

FIG. 4 is an explanatory diagram showing an example of the manual mode setting screen S2 displayed on the display 42. FIG. 5 is an explanatory diagram showing an example of the engine characteristics setting screen S3 displayed on the display 42. When the ECU 50 permits a change in the transmission output torque (simulated torque) Tmtout, when the passenger selects the manual mode setting button B1 on the change reception screen S1, the ECU 50 displays a message as shown in FIG. 4 instead of the change reception screen S1. A manual mode setting screen S2 is displayed. On the manual mode setting screen S2, there are an engine setting button B20 for setting the torque characteristics of the engine to be simulated in the variable speed driving mode, a transmission setting button B21 for setting the manual transmission to be simulated, and a button for selecting the engine sound to be simulated. A sound setting button B22 and a set setting button 23 for selecting one vehicle model from a plurality of vehicle models equipped with an engine and a manual transmission are displayed.

When the engine setting button B20 is selected by the passenger on the manual mode setting screen S2, an engine characteristics setting screen S3 shown in FIG. 5 is displayed instead of the manual mode setting screen S2. In the engine characteristics setting screen S3, a performance display screen S30 that displays an engine performance curve showing torque characteristics and output characteristics with the horizontal axis being the engine speed, and input buttons B30, B31, and B32 for inputting maximum output, maximum torque, and maximum rotation speed in the engine performance curve are displayed. When the maximum output, maximum torque, and maximum rotation speed are input using input buttons B30, B31, and B32, the engine performance curve displayed on the performance display screen S30 is changed according to the input values. In the variable speed driving mode, the performance curve of the engine to be simulated is displayed on the performance display screen S30, and the virtual output from the engine of the engine vehicle to be simulated is calculated based on the accelerator operation amount Acc and the virtual engine speed Ne. Set engine output torque Teout. In this way, the torque characteristics of the engine of the simulated engine vehicle can be changed using the screen displayed on the display 42. Thereby, the transmission output torque (simulated torque) Tmtout can be changed.

When the transmission setting button B21 is selected by the passenger on the manual mode setting screen S2, a transmission characteristic setting screen (not shown) is displayed instead of the manual mode setting screen S2. The transmission characteristics setting screen includes a performance display screen that displays a transmission characteristic curve that shows driving force characteristics and engine rotation speed characteristics with the horizontal axis as vehicle speed (velocity), and a screen that allows you to input the gear ratio of each gear. An input button is displayed. When the gear ratio of each gear stage is input using the input button, the gear ratio of each gear stage is changed to the input numerical value, and the speed change characteristic curve is changed according to the input numerical value. In the shift driving mode, the transmission output torque (simulated torque) Tmtout is calculated as the shift characteristic curve displayed on the performance display screen of the shift characteristic curve of the manual transmission to be simulated. In this way, the characteristics of the transmission of the simulated engine vehicle can be changed using the screen displayed on the display 42. Thereby, the transmission output torque (simulated torque) Tmtout can be changed.

When the sound setting button B22 is selected by the passenger on the manual mode setting screen S2, a sound setting screen (not shown) is displayed instead of the manual mode setting screen S2. This sound settings screen allows you to change the volume of the engine sound.

When the set setting button B23 is selected by the passenger on the manual mode setting screen S2, a simulated vehicle setting screen (not shown) is displayed instead of the manual mode setting screen S2. This simulated vehicle setting screen allows you to change the engine vehicle to be simulated in variable speed driving mode from an existing vehicle. Thereby, the transmission output torque (simulated torque) Tmtout can be changed.

In this way, when the vehicle is stopped in the variable speed driving mode and the shift position SP is in the parking range or the parking brake 27 is activated, the transmission output torque (simulated torque) Tmtout is permitted. By accepting changes on the change reception screen S1, the transmission output torque (simulated torque) Tmtout and the sound can be changed. When the shift position SP is in the parking range or when the parking brake 27 is activated, the battery electric vehicle 20 is reliably stopped, so the behavior of the vehicle can be changed without sudden changes.

When the battery electric vehicle 20 is running in S110, or even if it is stopped in S110, when the shift position SP is not in the parking range and the parking brake 27 is not operating in S120, the transmission output torque (simulated Changes in torque) Tmtout are prohibited (S140), and this routine is ended. In this case, even if the manual mode setting button B1 is selected on the change reception screen S1 displayed on the display 41, the display is not changed, the display on the change reception screen S1 is maintained, and the transmission output torque (simulated Torque) Tmtout and sound cannot be changed. In this way, when the shift position SP is not in the parking range and the parking brake 27 is not operating even when driving in the variable speed driving mode or when stopped, the transmission output torque (simulated torque) Tmtout is prohibited to be changed and the sound is prohibited to be changed, it is possible to suppress sudden changes in the behavior of the vehicle while it is running or when it is not reliably stopped.

In the battery electric vehicle 20 of the embodiment described above, when the variable speed driving mode is selected, changes in the transmission output torque (simulated torque) Tmtout are prohibited during driving, thereby preventing sudden changes in the behavior of the vehicle. It can be suppressed.

In addition, in the battery electric vehicle 20 of the embodiment, when the variable speed driving mode is selected, when the vehicle is stopped and the shift position SP is in the parking range or the parking brake 27 is operating, the transmission output torque is By allowing a change in the (simulated torque) Tmtout, the transmission output torque (simulated torque) Tmtout can be changed without suddenly changing the behavior of the vehicle.

Furthermore, in the battery electric vehicle 20 of the embodiment, when the variable speed driving mode is selected, a change reception screen S1 for accepting a change instruction of the transmission output torque (simulated torque) Tmtout is displayed on the display 42, and while the vehicle is driving, By prohibiting acceptance on the change reception screen S1, sudden changes in the behavior of the vehicle can be suppressed.

Figure 6:
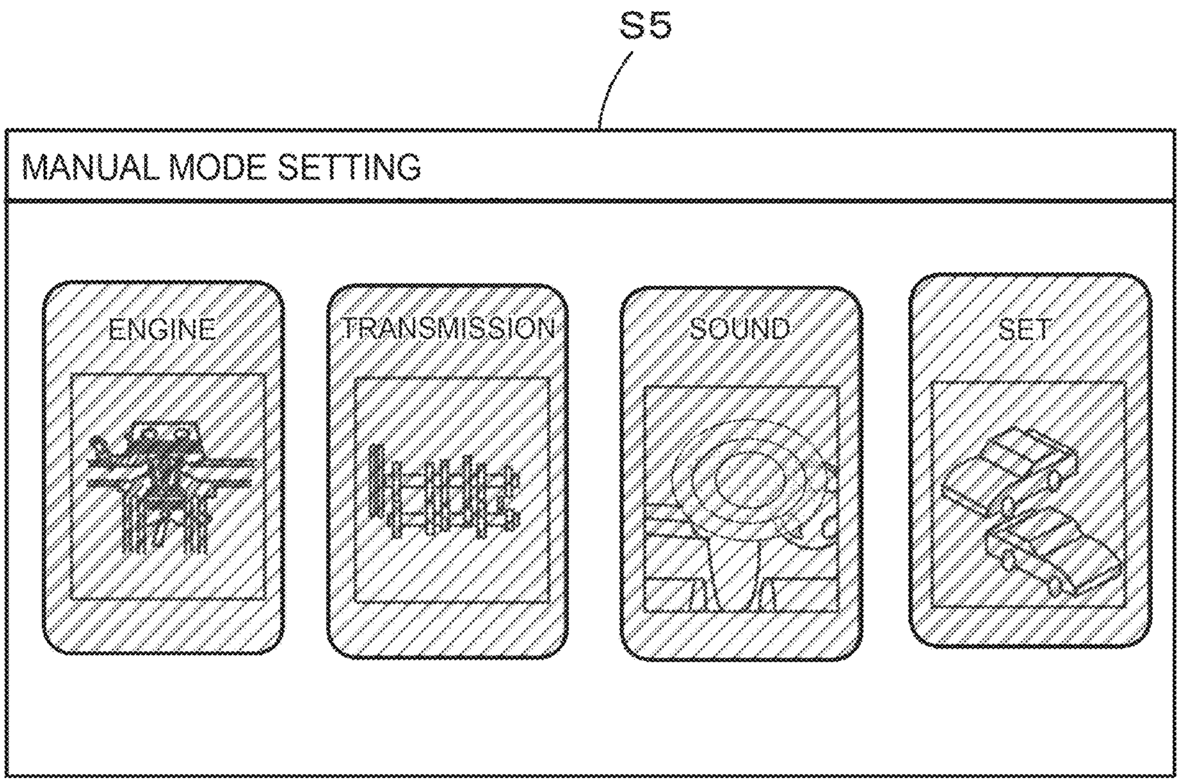
FIG. 6 is an explanatory diagram showing an example of the manual mode setting screen S2 displayed on the display 42 while the vehicle is traveling in the variable speed driving mode.

In the battery electric vehicle 20 of the embodiment, when the variable speed driving mode is selected, changing the transmission output torque (simulated torque) Tmtout is prohibited by prohibiting reception on the change reception screen S1 while driving. are doing. However, when the manual mode setting button B1 is selected on the change reception screen S1 displayed on the display 41, the manual mode setting screen S2 is displayed instead of the change reception screen S1, and as shown in FIG. 6, on the manual mode setting screen S2, by making the engine setting button B20, transmission setting button B21, sound setting button B22, and set setting button B23 gray (hatched in the figure) and making each button unselectable, changes in the transmission output torque (simulated torque) Tmtout may be prohibited.

In the battery electric vehicle 20 of the embodiment, when the variable speed driving mode is selected, the change reception screen S1 is displayed on the display 42 regardless of whether the vehicle is traveling. The change reception screen S1 may not be displayed on the display 42.

In the battery electric vehicle 20 of the embodiment, the display 42 is a touch panel type display device, and when the variable speed driving mode is selected, each selection on the change reception screen S1, the manual mode setting screen S2, and the engine characteristics setting screen S3 is displayed. The occupant selects each change on the display 42, transmission characteristic setting screen, sound setting screen, and simulated vehicle setting screen. However, it is possible for the passenger to carry and communicate with the ECU 50 each selection on the change reception screen S1, manual mode setting screen S2, and each change on the engine characteristics setting screen S3, transmission characteristic setting screen, sound setting screen, and simulated vehicle setting screen. You may also use a mobile terminal. In this case, while the vehicle is running, changing the transmission output torque (simulated torque) Tmtout may be prohibited by not accepting instructions from the mobile terminal.

In the battery electric vehicle 20 of the embodiment, when the variable speed driving mode is selected, when the vehicle is stopped and in the parking range or the parking brake 27 is activated, the transmission output torque (simulated torque) Tmtout is Allows changes. However, regardless of whether, it may be possible to permit a change in the transmission output torque (simulated torque) Tmtout when the vehicle is in the parking range or when the parking brake 27 is operating. The transmission output torque (simulated torque) Tmtout may be allowed to be changed based on only one of the range and the operation of the parking brake 27. Further, regardless of the parking range or the operation of the parking brake 27, while the vehicle is stopped, the transmission output torque (simulated torque) Tmtout may be allowed to be changed.

In the battery electric vehicle 20 of the embodiment, the shift position SP is changed by the driver's operation of the shift lever 61. However, the present disclosure can also be applied to a case where two paddle switches are provided near the steering wheel and the shift position SP is changed by upshifting or downshifting based on paddle signals from the paddle switches.

The correspondence between the main elements of the embodiment and the main elements of the disclosure described in SUMMARY will be described. In the embodiment, the motor 32 corresponds to a "motor," the mode changeover switch 68 corresponds to a "mode selection device," and the ECU 50 corresponds to a "control device."

As for the correspondence between the main elements of the embodiment and the main elements of the disclosure described in SUMMARY, since the embodiment is an example for specifically describing a mode for carrying out the disclosure described in SUMMARY, the embodiment does not limit the elements of the disclosure described in SUMMARY. In other words, the interpretation of the disclosure described in SUMMARY should be performed based on the description in SUMMARY, and the embodiment is merely a specific example of the disclosure described in SUMMARY.

Although the modes for carrying out the disclosure have been described above with the embodiment, the disclosure is not limited to the embodiment, and may be embodied in various modes without departing from the scope of the disclosure.

The present disclosure can be used in the battery electric vehicle manufacturing industry.

What is claimed is:

1. A battery electric vehicle comprising:

a display device that displays information a motor that outputs torque to a drive shaft connected to an axle;

a mode selection device in which one travel mode is selected from a plurality of travel modes by an operation of a driver, the travel modes including a motor travel mode in which the motor is controlled such that required torque required for traveling is output to the drive shaft, and a shift travel mode in which the motor is controlled such that torque output to the drive shaft based on a shift operation by the driver is simulation torque that simulates torque behavior in an engine vehicle equipped with an engine and a stepped transmission; and a control device that controls the motor such that the battery electric vehicle travels in the travel mode selected by the mode selection device, wherein the control device prohibits a change in the simulation torque while the battery electric vehicle is traveling, when the shift travel mode is selected, wherein when the shift travel mode is selected, the control device displays, on the display device a change reception screen for receiving an instruction to change behavior of the simulation torque, while the battery electric vehicle is stopped, and does not display the change reception screen on the display device while the battery electric vehicle is traveling.

2. The battery electric vehicle according to claim 1, wherein the control device permits the change in the simulation torque in a case in which a shift position is in a parking range, when the shift travel mode is selected.

3. The battery electric vehicle according to claim 1, wherein the control device permits the change in the simulation torque in a case in which a parking brake is operated, when the shift travel mode is selected.

4. The battery electric vehicle according to claim 1, wherein, when the shift travel mode is selected, the control device displays, on the display device, the change reception screen for receiving the instruction to change the simulation torque, and prohibits reception on the change reception screen while the battery electric vehicle is traveling.

* * * * *